(12) United States Patent
Wong et al.

(10) Patent No.: US 8,145,929 B2
(45) Date of Patent: Mar. 27, 2012

(54) STOCHASTIC MANAGEMENT OF POWER CONSUMPTION BY COMPUTER SYSTEMS

(75) Inventors: Wendy C. Wong, San Jose, CA (US); Eve M. Schooler, Portola Valley, CA (US); Shivani A. Sud, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/175,416

(22) Filed: Jul. 1, 2011

(65) Prior Publication Data

US 2011/0264939 A1 Oct. 27, 2011

(51) Int. Cl.
 G06F 1/32 (2006.01)
 G06F 1/00 (2006.01)
(52) U.S. Cl. .................... 713/320; 713/300; 713/310
(58) Field of Classification Search .................... 713/300
 See application file for complete search history.

(56) References Cited

U.S. PATENT DOCUMENTS

| | | | |
|---|---|---|---|
| 7,543,166 B2 * | 6/2009 | Zimmer et al. | 713/310 |
| 7,788,205 B2 * | 8/2010 | Chalasani et al. | 706/48 |
| 2005/0060590 A1 * | 3/2005 | Bradley et al. | 713/320 |
| 2008/0104587 A1 * | 5/2008 | Magenheimer et al. | 718/1 |
| 2010/0306560 A1 * | 12/2010 | Bozek et al. | 713/320 |

OTHER PUBLICATIONS

Nathuji et al, VirtualPower: Coordinated Power Management in Virtualized Enterprise Systems, Oct. 14-17, 2007, SOSP'07 Stevenson, Washington, USA, pp. 265-278.*
Bonabeau, E. et al., "Fixed Response in Thresholds and the Regulation of Division of Labor in Insect Societies," Bulletin of Mathematical Biology, 1998, pp. 753-807, vol. 60.
Chavez, A. et al., "Challenger: A Multi-agent System for Distributed Resource Allocation," In Agents, 1997, pp. 323-331.
Kalra, N. et al. "A Comparative Study of Market-Based and Threshold-Based Task Allocation," 8th International Symposium on Distributed Autonomous Robotic Systems, Jul. 2006, 11 pages.

* cited by examiner

*Primary Examiner* — Suresh Suryawanshi
(74) *Attorney, Agent, or Firm* — Schwabe, Williamson & Wyatt, P.C.

(57) ABSTRACT

Embodiments of the present disclosure describe methods, computer-readable media and system configurations for stochastic power management of one or more computer systems. A method may include ascertaining a workload of a plurality of computer systems (e.g., a data center). Additionally or alternatively, a method may include initiating, by a control module operated by a processor of a first of the plurality of computer systems, a stochastic power management process to manage power consumption of the first of the plurality of computer systems. The stochastic power management process may be conditionally initiated based at least in part on the ascertained workload of the plurality of computer systems. The stochastic power management process may include a plurality of virtual machine management actions having corresponding probabilities being taken, one or more of which may result in power savings. Other embodiments may be described and/or claimed.

20 Claims, 3 Drawing Sheets

STOCHASTIC MANAGEMENT OF POWER CONSUMPTION BY COMPUTER SYSTEMS

FIELD

Embodiments of the present disclosure generally relate to the field of digital computing, and more particularly, to methods, systems and articles of manufacture associated with stochastically managing power consumption by a group of computing systems.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Cloud computing centers may include a data center (also referred to as a "server farm") that includes a plurality of homogenous and/or heterogeneous computer systems. A workload of a data center may vary over time, with lighter loads often occurring at night, during holidays and on weekends, and heavier loads often occurring in the daytime on weekdays. No matter the workload, task allocation algorithms used in data centers typically allocate jobs among computer systems so that the job completion time is minimized. A computer system may take on multiple jobs without significantly increasing the job completion time of each individual job due to the presence of multi-core computer chips.

Even under light workloads, a data center may consume a significant amount of power. Jobs may be distributed among all computer systems of the data center to minimize run time so that most or all of the computer systems remain up and running at all times, requiring constant power. Power consumption of an individual computer system may be reduced by entering into a power saving mode, such as shut down, sleep, or low power standby.

Division of labor has been observed in ant colonies without centralized control, and has been modeled by a threshold-based algorithm, for instance, for the probability of tending to brood care $P(j)$, where:

$$P(j) = \frac{s(t)^n}{s(t)^n + \theta(t)^n};$$

such that $s(t)$ represents an intensity of a particular stimulus, and $\theta(t)$ represents a threshold of responding to $s(t)$. From experiments observing actual ant colony behavior, setting n to 2 approximates the ant behavior the best. An example stimulus is a need of the ant colony for brood care. Smaller ants typically tend to brood care and larger ants work outside the nest. Thus, small ants may have a lower threshold $\theta(t)$ than larger ants, and hence, a higher probability $P(j)$ of tending to brood care than larger ants. However, If smaller ants are removed from the colony, less brood care may be provided, raising $s(t)$. Once $s(t)$ reaches a certain level, larger ants are likely to begin tending to brood care in spite of their higher threshold.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide methods, systems and computer-readable media for stochastic power management of computer systems, e.g., computer systems in data centers. In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
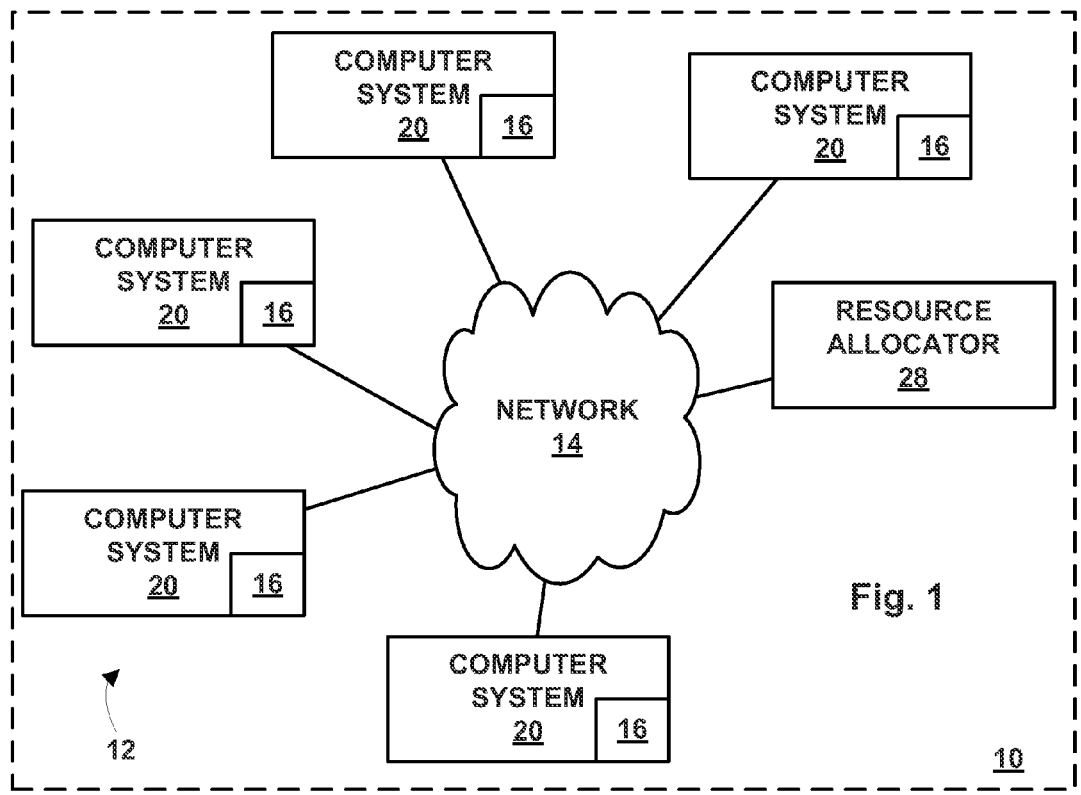
FIG. 1 schematically illustrates a data center according to an embodiment of the disclosure.

FIG. 1 schematically illustrates an example data center 10 that includes a plurality of computer systems 12 in communication via a computer network 14, incorporated with stochastic power management ("SPM"), in accordance with embodiments of the present disclosure. Utilization of SPM in one or more computer systems of the plurality of computer systems 12 may result in a net power savings throughout data center 10 as one or more computer systems may enter into power saving mode.

Computer network 14 may be one or more local area networks ("LAN") and/or one or more wide area networks ("WAN"), including the Internet. In other words, data center 10 may be located at a single geographical location or distributed among multiple geographical locations. Each individual computer system of the plurality of computer systems 10 will be referenced on an individual basis with the number 20. However, that is not meant to imply that each computer system 20 is the same or that the plurality of computer systems 12 includes heterogeneous or homogeneous computer systems. Rather, each computer system 20 may be the same or different from other computer system(s) 20 of data center 10. As will be described in more detail below, at least selected ones, possibly all, of computer systems 20 are incorporated with embodiments of SPM 16 of the present disclosure.

Figure 2:
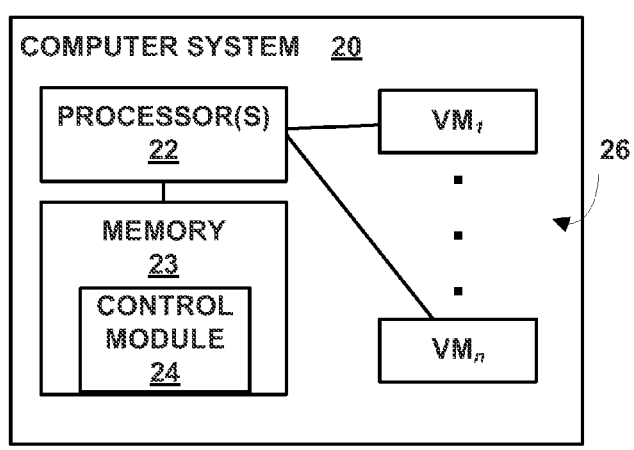
FIG. 2 depicts an example computer system of a data center according to an embodiment of the disclosure.

FIG. 2 schematically illustrates an example individual computer system 20 of the plurality of computer systems 12 forming data center 10. Computer system 20 may include at least one processor 22. Computer system 20 also may include a SPM control module 24, disposed in system memory 23, operable by processor(s) 22, to perform various SPM related functions, including but not limited to, workload determinations and stochastic virtual machine management actions, as will be described further below. System memory 23 may include non-transitory computer-readable persistent or non-persistent storage medium, such as Dynamic Random Access Memory (DRAM), Static Random Access Memory (SRAM), Flash, and so forth.

Computer system 20 also may include one or more virtual machines ("VMs") 26 operated by processor(s) 22. In some embodiments, each VM may be assigned one or more jobs (by a job scheduler (not shown) of data center 10) for execution. As used herein, a "job" may include any task or operation that may be performed within a VM by a computer processor, such as calculations, database operations, graphical operations, statistical analysis, and so forth.

Each VM of a computer system 20 may have various parameters that define its resources and capabilities, and that may be communicable to other computer systems or VMs. These VM parameters may include but are not limited to resources it requires (e.g., minimum, average, maximum) in terms of processing power, memory usage, network bandwidth, long term storage access, service level agreements, and whether the VM is permitted to be migrated to other computer systems.

Each computer system 20 may have various parameters that may define its resources and capabilities. These parameters may be communicable to other computer systems of the plurality of computer systems 12. These parameters may include but are not limited to number of processors or cores, amount/type(s) of available memory, network capabilities, access to long-term storage, access policies, whether the computer system is permitted to participate in VM migration, and a maximum number of VMs (hereafter referred to as "M") the computer system can support.

Some computer systems 20 of data center 10 may have one or more VMs that are assigned mission-critical jobs, and therefore may not be permitted to perform VM migration or enter into power saving mode. For example, a computer system designated as a resource allocator 28 of data center 10, which means it may be charged with delegating jobs and/or resources among the plurality of computer systems 12, and may not be permitted to migrate its VMs and/or enter into a power saving mode. While for ease of understanding, resource allocator 28 is illustrated as a separate computer system, in embodiments, resource allocator 28 may be a VM on a computer system, or an application within a VM on a computer system.

In some embodiments, mission-critical jobs may be similarly aggregated at a subset of the plurality of computer systems 12, rather than distributed among all of the plurality of computer systems 12. As a result, a majority of the plurality of computer systems 12 not assigned mission-critical jobs may still participate in VM migration to reduce power consumption, using embodiments of SPM of the present disclosure.

Figure 3:
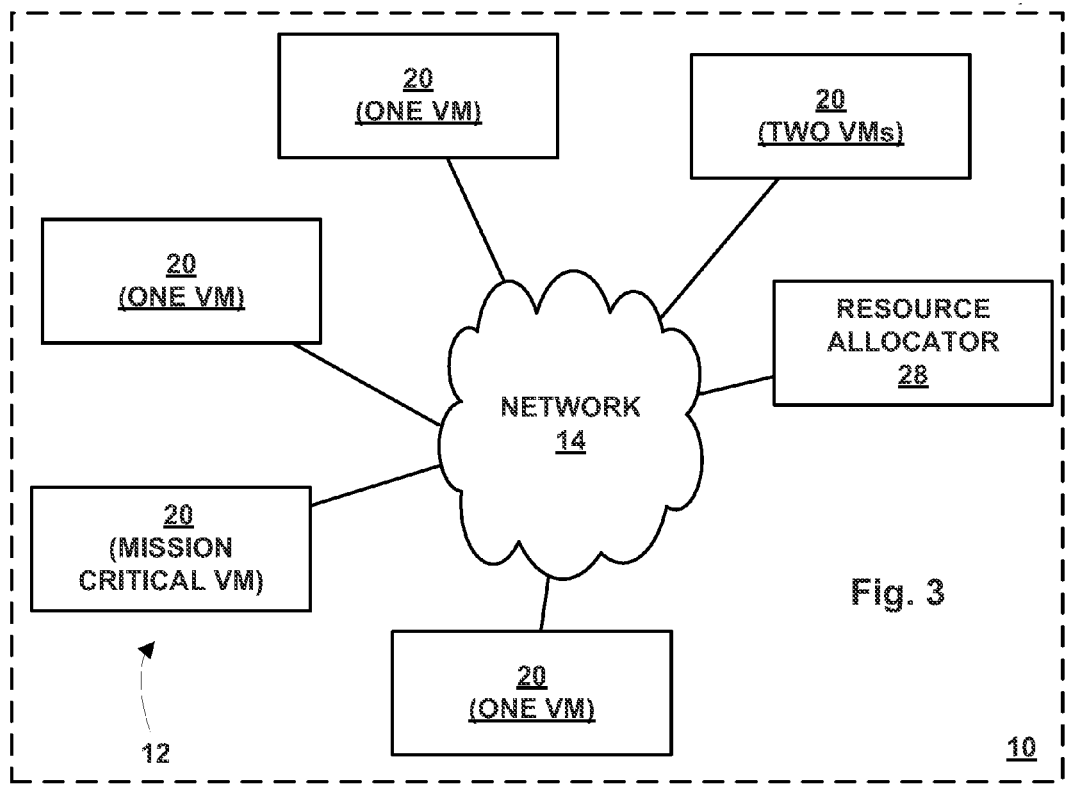
FIGS. 3 and 4 schematically illustrate a data center before and after data migration according to an embodiment of the disclosure.
Figure 4:
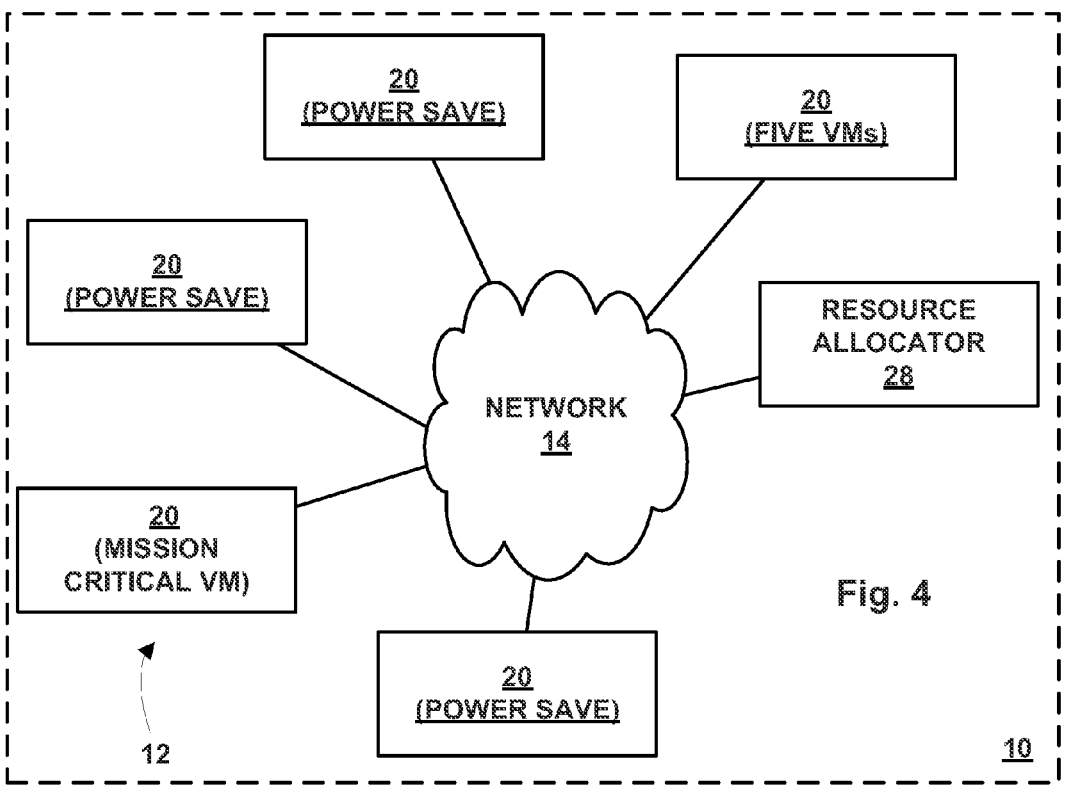

In some embodiments, individual VMs may be assigned mission-critical jobs, and may not be migrated from one computer system to another. In some embodiments, therefore, VMs assigned mission-critical jobs may be limited to computer systems 20 that are not permitted to participate in VM migration and/or enter into power saving mode, as illustrated in FIGS. 3-4.

The term "power saving mode" as used herein may include but is not limited to shutting down a computer system entirely, putting a computer system to "sleep" and/or entering a computer into low power standby. In some embodiments, regardless of the power saving mode used, a computer system in power saving mode may be configured to return to full power-on mode, for example on request or after a time interval.

In some embodiments, VM migration among the plurality of computer systems 12 of data center 10 may be permitted where a workload of data center 10 is light. A workload of data center 10 may be ascertained at various times, in various ways, by various components of data center 10, as will be discussed below.

A light workload condition may indicate that work being performed by data center 10 may be consolidated onto a subset of the plurality of computer systems 12, allowing remaining computer systems of the plurality of computer systems 12 to enter into power saving mode. Thus, in some embodiments, if a workload of a data center is ascertained to be light, computer systems having fewer VMs may attempt to shed their VMs first so that one or more computer systems 20 may enter into power saving mode. With multi-core processors, each computer system 20 may run multiple jobs without impacting the job completion time of each individual job. In contrast, a data center experiencing a heavy workload may need most or all of its computer systems up and running to complete jobs. Thus, in some embodiments, if a workload of a data center is ascertained to be heavy, VM migration may not be permitted.

An example of VM migration is depicted in FIGS. 3 and 4. FIG. 3 depicts elements similar to (and referenced by the same reference numbers as) those depicted in FIG. 1. One computer system 20 has two VMs, three computer systems 20 have one VM each, and one computer system 20 has a mission-critical VM.

A workload of data center 10 may be ascertained and may be determined to be low. This may facilitate initiation at each computer system 20 (except for the computer system 20 with the mission-critical VM) of a stochastic power management process. Computer systems with fewer VMs may be more likely to attempt to shed their jobs. Computer systems with more VMs may be more likely to accept those jobs and may even solicit jobs from other computer systems. If a time required to migrate a VM is greater than a time required to run one or more jobs assigned to the VM to completion, then the one or more jobs of the VM may be permitted to run to completion instead, as will be discussed below.

FIG. 4 shows an example of what the data center 10 of FIG. 3 may look like after VM migration. A single computer system 20 now has all five non-mission-critical VMs. This may be the same computer system 20 that previously had two VMs, which was more than the other computer systems 20. The other computer systems 20 (having shed their VMs) have entered into power saving mode. Thus, data center 10 may now only provide full power to three computer systems 20, rather than six.

Figure 5:
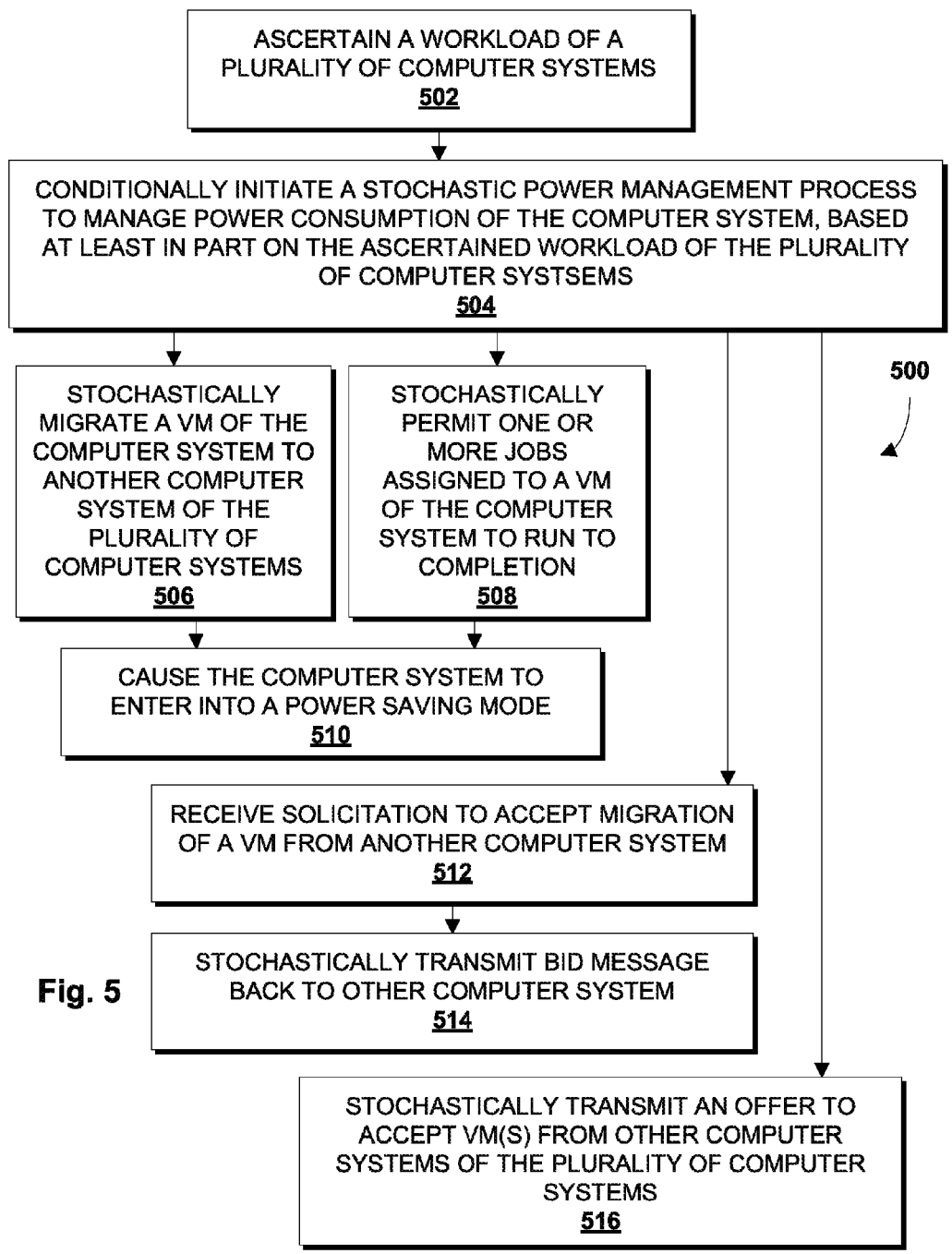
FIG. 5 depicts an example stochastic power management process, according to an embodiment of the disclosure.

An example process 500 according to an embodiment of the disclosure is depicted in FIG. 5. Although shown in a particular order, this is not meant to be limiting. It should be understood that one or more of the depicted actions may be performed in different orders than shown and/or omitted without departing from the spirit of the disclosure.

At 502, a workload of a plurality of computer systems 12, such as a data center 10 in FIG. 1, may be ascertained by, e.g., a SPM control module 24 of an individual computer system 20. In other embodiments, this action may be performed by a resource allocation agent 28 of data center 10, another designated control module, and so forth.

In some embodiments, SPM control module 24 may ascertain a workload of data center 10 at 502 by receiving notification (e.g., via a broadcast signal from resource allocation agent 28) containing information about the workload. The information about the workload may include whether the workload is above or below a particular threshold, the actual workload as a percentage of total workload capacity of data center 10, and so forth.

In some embodiments, SPM control module 24 of an individual computer system 20 may ascertain the workload itself at 502 by estimating the workload of the plurality of computer systems 12 of data center 10. This estimation may be performed based at least in part on job assignments to one or more VMs of the computer system 20 hosting the SPM control module 24.

For instance, SPM control module 24 of a computer system 20 may estimate the workload of data center 10 based on its own workload, $S_{loading}$, which in some embodiments may be a number of VMs on the computer system 20 on which SPM control module 24 resides. Additionally or alternatively, SPM control module 24 may estimate the workload of data center 10 based on a time elapsed since the last job arrival, $T_{last\_job}$ at the computer system 20. SPM Control module 24 also may estimate the workload of data center 10 based on a mean time passed between job arrivals, $T_M$, at the computer system 20, as well as a standard deviation of time intervals between these job arrivals, $T_{STD}$, at the computer system 20.

In some embodiments, SPM control module 24 may determine that a workload of data center 10 is heavy where new jobs arrive at the computer system 20 frequently, using equations such as $T_{last\_job}<=T_M+\alpha\times T_{STD}$ or $S_{loading}>\beta\times M$. In some embodiments, SPM control module 24 may determine that a workload of data center 10 is light where new jobs arrive at the computer system 20 infrequently, using equations such as $T_{last\_job}>T_M+\alpha\times T_{STD}$, or $S_{loading}>\gamma\times M$. Parameters α, β and γ may be determined empirically and/or from analysis using queuing theory. In some embodiments, 0<β<=1, 0<γ<=1 and/or γ<β.

Referring also to FIG. 2, at 504, a stochastic power management process may be conditionally initiated, based at least in part on the workload of data center 10 ascertained at 502. The stochastic power management process may include a plurality of VM management actions being stochastically and/or deterministically taken. Each of the stochastic actions may have a corresponding probability of occurring. In some embodiments, at least one of the VM management actions may result in power savings. Examples of stochastic VM management actions of the stochastic power management process may be seen at 506, 508, 514 and 516.

At 506, a VM j of the computer system 20 may be stochastically migrated, for instance by SPM control module 24, to another computer system 20 of data center 10. The probability of the computer system 20 stochastically migrating the VM j to another computer system 20 may be $P_1(j)$. In some embodiments, $P_1(j)$ may be calculated, e.g., by SPM control module 24, for a period of time t as follows:

$$P_1(j) = \frac{s_1(t)^2}{s_1(t)^2 + \theta_{1,j}(t)^2}; \quad \text{Probability 1}$$

In some embodiments, $s_1(t)=m$ if computer system 20 has m VMs (m≧1) assigned one or more jobs and $s_1(t)=0$ if computer system 20 has no VMs assigned one or more jobs.

In some embodiments, $\theta_{1,j}(t)$ may be directly proportional to a number of VMs of a computer system 20. The more VMs on computer system 20, the more $\theta_{1,j}(t)$ increases, and as $\theta_{1,j}(t)$ increases, $P_1(j)$ decreases. Put another way, a computer system 20 with relatively large number of VMs is less likely to migrate these VMs away.

In some embodiments, $\theta_{1,j}(t)$ may additionally or alternatively be proportional to level of network congestion among the plurality of computer systems 12 of data center 10. As network congestion increases, $\theta_{1,j}(t)$ increases and $P_1(j)$ decreases. Put another way, the busier the network 14, the less likely a computer system 20 will migrate away VMs, as doing so may require more time than retaining the VM, and may also increase network congestion.

In some embodiments, $\theta_{1,j}(t)$ may be inversely proportional to an amount of time needed to run to completion one or more jobs assigned to the VM j. The longer the job, the lower the $\theta_{1,j}(t)$, which in turn increases $P_1(j)$. Jobs that take a longer time to run may be better candidates for migration than shorter jobs, which may take longer to migrate than to run to completion.

In some embodiments, migrating a VM j of a first computer system 20 of data center 10 to another computer system 20 of data center 10 may include soliciting, by SPM control module 24 of the first computer system 20, bids from others of the data center 10 to accept one or more VMs of the first computer system 20. Such a solicitation may include the first computer system 20 broadcasting a request to accept the first computer system's VMs. Additionally or alternatively, the first computer system 20 may multicast the request to other computer systems 20 of data center 10 that have offered to accept VMs. In either case, the request may include information such as resources (e.g., memory, processing power, network bandwidth) needed for a job assigned to the VM j, estimated time required to complete the job, a time at which the message was transmitted, and so forth. Other computer systems 20 may respond to the request by returning bids for the VM j.

In some embodiments, SPM control module 24 of a computer system 20 soliciting bids to accept its jobs may wait for a predetermined time interval before making a decision on a destination computer system for its VMs. This may allow time for multiple bids to arrive from multiple computer systems 20. At the end of the time interval, SPM control module 24 may rank all bids using various algorithms. In some embodiments, SPM control module 24 may rank the bids based on which offering computer systems can take all or more the VMs. This may reduce network traffic and/or consumption of resources as less handshaking with less computer systems may be needed. After deciding on which bid(s) to accept, SPM control module 24 of the VM-shedding computer system 20 may send out message(s) to other computer system(s) (e.g., those able to accept the most jobs) and initiate VM migration. Once a computer system 20 has no more VMs, it may enter power saving mode.

In some embodiments, network congestion may be estimated based at least in part on latency, i.e., a difference between a time a message was transmitted by a sender computer system 20 and a time the message was received by a receiver computer system 20.

At 508, one or more jobs assigned to a VM of a computer system 20 may be stochastically permitted to run to completion, e.g., by SPM control module 24. This may be based at least in part on a second probability, $P_2(j)$, which may be calculated as:

$$P_2(j) = 1 - P_1(j) \qquad \text{Probability 2}$$

Thus, in some embodiments, $P_1(j)$ and $P_2(j)$ add up to one, which means that any given VM j of a computer system 20 will either be migrated to another computer system 20 of data center 10 or permitted to run to completion. Once all VMs of a computer system 20 are either migrated away at 506 or run to completion at 508, SPM control module 24 may cause the computer system 20 may enter into a power saving mode at 510.

In some embodiments, at 512, SPM control module 24 of computer system 20 may receive a solicitation, from another computer system 20 of the plurality of computer systems, to accept migration of a VM. At 514, SPM control module 24 may stochastically transmit a bid message back to the other computer system 20. Such a bid message may include various information, such as which VMs of the other computer system 20 SPM control module 24 wishes to accept, and/or times the solicitation was received and/or the bid returned.

Stochastically transmitting the bid message back to the soliciting computer system at 514 may be based on a probability $P_3(j)$ for the computer system to accept a VM j from another one of computer systems. In some embodiments, $P_3(j)$ may be represented by the following equation:

$$P_3(j) = \frac{s_3(t)^2}{s_3(t)^2 + \theta_{3j}(t)^2} \qquad \text{Probability 3}$$

In some embodiments, $s_3(t)$ may be a number of times the solicitation has been received within a predetermined time interval t. $\theta_{3j}(t)$ may be directly proportional to a level of network congestion among a plurality of computer systems 12 of data center 10. Put another way, the higher the network congestion, the less likely SPM control module 24 will respond to solicitations to accept jobs. Accepting VMs may take longer than allowing the jobs of the offered VMs to run to completion if the network congestion (and hence, latency) is high. Moreover, accepting VMs may increase network congestion.

In some embodiments, $\theta_{3j}(t)$ may be inversely proportional to a number of VMs of the computer system 20. The more VMs a computer system 20 has, the lower $\theta_{3j}(t)$ will be, which in turn increases the probability $P_3(j)$ will accept a VM j from another computer system 20.

In some embodiments, $\theta_{3j}(t)$ may additionally or alternatively be inversely proportional to an amount of time needed to complete one or more jobs assigned to the VM j. In other words, it may be more efficient to allow shorter jobs of other computer systems to run to completion, instead of attempting to accept them.

In some embodiments, at 516, SPM control module 24 of a computer system 20 may stochastically transmit an offer to accept one or more VMs from other one or ones of computer systems of data center 10. This may be based on a probability $P_4(t)$, which may be determined using the following equation:

$$P_4(t) = \frac{s_4(t)^2}{s_4(t)^2 + \theta_{4j}(t)^2} \qquad \text{Probability 4}$$

In some embodiments, $s_4(t)$ may be based on a number of solicitations to accept VMs, received by the computer system from other computer systems of the plurality of computer systems, within a predetermined time window t. In some embodiments, $s_4(t)$ may additionally or alternatively be based on an average number of jobs per solicitation.

$\theta_{4j}(t)$ may be directly proportional to a level of network congestion. The more congested the network, the less likely a computer system will transmit offers to accept VMs from other computer systems.

$\theta_{4j}(t)$ also may be inversely proportional to a number of VMs of the computer system. That is, the more VMs a computer system has, the more likely it is to offer to accept VMs from other computer systems.

Additionally or alternatively, $\theta_{4j}(t)$ may be inversely proportional to a computer system's capacity to accept VMs. That is, the more capacity a computer system 20 has in terms of resources (e.g., memory, processing power, network bandwidth), the more likely it is to offer to accept VMs from other computer systems 20.

In some embodiments, a SPM control module 24 that transmits offers to accept VMs from other computer systems 20 may broadcast a message to all computer systems 20 of data center 10. In other embodiments, SPM control module 24 may multicast the message to computer systems 20 of data center 10 that have sent out solicitations for other computer systems to accept VMs. In either case, a reply message from another computer system 20 ready to accept the offer and shed a job may include various information such as resources needed for the job, an estimated time required to complete jobs the other computer system wishes to shed, time the message was sent, and so forth.

After receiving one or more reply messages (e.g., within a time interval), SPM control module 24 of the computer system 20 may rank replies and choose which VMs from which computer systems to accept. This may be based on which computer system(s) have the lightest loads, which may indicate that those servers could enter into power saving mode more quickly.

Probabilities 1-4 may be evaluated and reevaluated after initiation of the stochastic power management process at various times. In some embodiments, SPM control module 24 may evaluate one or more of Probabilities 1-4 when a solicitation to accept VMs from another computer system is received. In some embodiments, SPM control module 24 may evaluate one or more of Probabilities 1-4 when one or more jobs assigned to a VM runs to completion. In some embodiments, SPM control module 24 may evaluate one or more of Probabilities 1-4 when a periodic timer times out.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A computer-implemented method, comprising:
    ascertaining, by a control module operated by a processor of a first of a plurality of computer systems, a workload of the plurality of computer systems; and
    conditionally initiating, by the control module, a stochastic power management process to manage power consumption of the first computer system, based at least in part on the ascertained workload of the plurality of computer systems, wherein the stochastic power management process includes a plurality of virtual machine ("VM") management actions having corresponding probabilities being taken, at least one action resulting in power savings of the first computer system.

2. The computer-implemented method of claim 1, wherein ascertaining the workload of the plurality of computer systems includes estimating, by the control module, the workload of the plurality of computer systems, based at least in part on job assignments to one or more VM of the plurality of computer systems.

3. The computer-implemented method of claim 1, wherein the plurality of VM management actions includes:
    stochastically permitting, by the control module, one or more jobs assigned to a VM of the first of the plurality of computer systems to run to completion; or
    stochastically migrating, by the control module, a VM of the first of the plurality of computer systems to a second of the plurality of computer systems.

4. The computer-implemented method of claim 3, wherein stochastically migrating comprises stochastically migrating based at least in part on a probability $P_1(j)$ of migrating a VM j of the first of the plurality of computer systems to another computer system of the plurality of computer systems, wherein:

$$P_1(j) = \frac{s_1(t)^2}{s_1(t)^2 + \theta_{1j}(t)^2};$$

where for a period of time t, $\theta_{1j}(t)$ is directly proportional to one or more of a number of VMs of the first of the plurality of computer systems and a level of network congestion among the plurality of computer systems;
    $s_1(t)=m$ if the first of the plurality of computer systems has m VMs assigned one or more jobs and $m \geq 1$, and $s_1(t)=0$ if the first of the plurality of computer systems has no VMs assigned one or more jobs.

5. The computer-implemented method of claim 4, wherein $\theta_{1j}(t)$ is inversely proportional to an amount of time needed to run to completion one or more jobs assigned to the VM j.

6. The computer-implemented method of claim 4, wherein stochastically permitting comprises stochastically permitting based at least in part on a probability $P_2(j)$ of permitting the one or more jobs assigned to the VM j to run to completion, wherein: $P_2(j)=1-P_1(j)$.

7. The computer-implemented method of claim 3, wherein migrating a VM of the first of the plurality of computer systems to a second of the plurality of computer systems includes soliciting, by the control module, others of the plurality of computer systems to accept one or more VMs of the first of the plurality of computer systems.

8. The computer-implemented method of claim 3, wherein the stochastic power management process further comprises causing, by the control module, the first of the plurality of computer systems to enter into a power saving mode.

9. The computer-implemented method of claim 1, wherein the plurality of VM management actions includes accepting, by the control module, one or more VMs from other one or ones of the plurality of computer systems.

10. The computer-implemented method of claim 9, further comprising:
    receiving, by the control module, a solicitation to accept migration of a VM j from another one of the plurality of computer systems, wherein the VM j is assigned one or more jobs; and
    stochastically transmitting, by the control module, based at least in part on a probability $P_3(j)$ for the first computer system to accept the VM j from another one of the plurality of computer systems, a bid message back to the another one of the plurality of computer systems.

11. The computer-implemented method of claim 10, wherein stochastically transmitting comprises stochastically transmitting based on the probability $P_3(j)$, wherein:

$$P_3(j) = \frac{s_3(t)^2}{s_3(t)^2 + \theta_{3j}(t)^2};$$

where $s_3(t)$ is a number of times the solicitation has been received within a predetermined time interval t;
    $\theta_{3j}(t)$ is directly proportional to a level of network congestion among the plurality of computer systems; and
    $\theta_{3j}(t)$ is inversely proportional to one or more of a number of VMs of the first of the plurality of computer systems and an amount of time needed to complete the one or more jobs assigned to the VM j.

12. The computer-implemented method of claim 1, wherein the plurality of VM management actions includes offering, by the control module, to accept one or more VMs from other one or ones of the plurality of computer systems.

13. The computer-implemented method of claim 12, further comprising:
    establishing, by the control module, a probability $P_4(t)$ for the first computer system to offer to accept one or more VMs from other one or ones of the plurality of computer systems; and
    stochastically transmitting, by the control module, an offer to accept VMs from the other one or ones of the plurality of computer systems.

14. The computer-implemented method of claim 13, wherein stochastically transmitting comprises stochastically transmitting based on the probability $P_4(t)$, wherein:

$$P_4(t) = \frac{s_4(t)^2}{s_4(t)^2 + \theta_{4j}(t)^2};$$

where $s_4(t)$ is based on number of solicitations to accept VMs, received by the first of the plurality of computer systems from other computer systems of the plurality of computer systems, within a predetermined time interval t and an average number of jobs per solicitation;
    $\theta_{4j}(t)$ is directly proportional to a level of network congestion; and
    $\theta_{4j}(t)$ is inversely proportional to one or more of a number of VMs of the first of the plurality of computer systems and a capacity to accept VMs of the first of the plurality of computer systems.

15. A computer system, comprising:
one or more processors;
a memory; and
a control module contained in the memory and configured to be operated by a processor of the one or more processors to:
  initiate a stochastic power management process to manage power consumption of the computer system, wherein the stochastic power management process results in a plurality of virtual machine ("VM") management actions having corresponding probabilities being taken; and
  cause the computer system to enter into a power saving mode where, as a result of the stochastic power management process, the computer system no longer has any executing VMs.

16. The computer system of claim 15, wherein the computer system is a first computer system of the data center, and the VM management actions include:
  stochastically migrating a VM j of the first computer system to a second computer system of the data center based at least in part on a probability $P_1(j)$, wherein:

$$P_1(j) = \frac{s_1(t)^2}{s_1(t)^2 + \theta_{1j}(t)^2};$$

where for a period of time t, $\theta_{1j}(t)$ is directly proportional to one or more of a number of VMs of the first computer system and a level of network congestion among the plurality of computer systems of the data center;
  $\theta_{1j}(t)$ is inversely proportional to an amount of time needed to run to completion one or more jobs assigned to the VM j;
  $s_1(t)=m$ if the first computer system has m VM assigned one or more jobs and $m \geq 1$, and $s_1(t)=0$ if the first computer system has no VMs assigned one or more jobs; or
  stochastically permitting one or more jobs assigned to a VM of the first computer system to run to completion based at least in part on a probability $P_2(t)$,
wherein: $P_2(j)=1-P_1(j)$.

17. The computer system of claim 15, wherein the computer system is a first computer system of the data center, and VM management actions include:
  receiving a solicitation to accept migration of a VM j from a second computer system of the data center, wherein the VM j is assigned one or more jobs; and
  stochastically transmitting a bid message back to the second computer system based at least in part on a probability $P_3(j)$, wherein:

$$P_3(j) = \frac{s_3(t)^2}{s_3(t)^2 + \theta_{3j}(t)^2};$$

where $s_3(t)$ is a number of times the solicitation has been received within a predetermined time interval t;
  $\theta_{3j}(t)$ is directly proportional to a level of network congestion among the plurality of computer systems of the data center; and
  $\theta_{3j}(t)$ is inversely proportional to one or more of a number of VMs of the first computer system and an amount of time needed to complete the one or more jobs assigned to the VM j.

18. The computer system of claim 15, wherein the VM management actions include:
  stochastically transmitting an offer to accept VMs from other one or ones of the plurality of computer systems of the data center, based on a probability $P_4(t)$, wherein:

$$P_4(t) = \frac{s_4(t)^2}{s_4(t)^2 + \theta_{4j}(t)^2};$$

where $s_4(t)$ is based on number of solicitations to accept VMs, received by the computer system from other computer systems of the data center, within a predetermined time interval t and an average number of jobs per solicitation;
  $\theta_{4j}(t)$ is directly proportional to a level of network congestion among the plurality of computer systems of the data center; and
  $\theta_{4j}(t)$ is inversely proportional to one or more of a number of VMs of the computer system and a capacity to accept VMs of the computer system.

19. A non-transitory computer-readable medium having computer-readable code embodied therein, the computer-readable code comprising instructions configured to enable a first computer system of a data center, in response to execution of the instructions, to perform a number of operations, including:
  ascertaining a workload of the data center; and
  conditionally initiating, on the first computer system of the data center, a stochastic power management process to manage power consumption of the first computer system, based at least in part on the ascertained workload of the data center, wherein the stochastic power management process includes a plurality of virtual machine ("VM") management actions having corresponding probabilities being taken, wherein at least one VM management action results in power saving in the data center.

20. The non-transitory computer-readable medium of claim 19, wherein the plurality of VM management actions includes one or more of:
  stochastically migrating a VM of the first of the plurality of computer systems to a second of the plurality of computer systems, based on a first probability;
  stochastically permitting one or more jobs assigned to a VM of the first of the plurality of computer systems to run to completion, based on a second probability;
  stochastically accepting one or more VMs from other one or ones of the plurality of computer systems, based on a third probability; and
  stochastically offering to accept one or more VMs from other one or ones of the plurality of computer systems, based on a fourth probability.

* * * * *